(12) United States Patent
Maddali et al.

(10) Patent No.: US 8,484,221 B2
(45) Date of Patent: Jul. 9, 2013

(54) ADAPTIVE ROUTING OF DOCUMENTS TO SEARCHABLE INDEXES

(75) Inventors: Kumar Maddali, Santa Clara, CA (US); Joy Thomas, Sunnyvale, CA (US)

(73) Assignee: Stratify, Inc., Mountain View, CA (US)

( * ) Notice: Subject to any disclaimer, the term of this patent is extended or adjusted under 35 U.S.C. 154(b) by 247 days.

(21) Appl. No.: 12/787,119

(22) Filed: May 25, 2010

(65) Prior Publication Data

US 2011/0191347 A1 Aug. 4, 2011

Related U.S. Application Data

(60) Provisional application No. 61/300,426, filed on Feb. 1, 2010.

(51) Int. Cl.
*G06F 17/30* (2006.01)

(52) U.S. Cl.
USPC ........... 707/741; 707/706; 707/711; 707/753; 707/754; 707/758

(58) Field of Classification Search
USPC .......................... 707/706, 711, 741, 753, 754
See application file for complete search history.

(56) References Cited

U.S. PATENT DOCUMENTS

| | | | |
|---|---|---|---|
| 7,020,654 B1 | 3/2006 | Najmi | |
| 7,634,517 B1 | 12/2009 | Burrows | |
| 7,908,279 B1 * | 3/2011 | Thirumalai et al. | 707/749 |
| 8,090,723 B2 * | 1/2012 | Cao et al. | 707/741 |
| 2001/0011271 A1 | 8/2001 | Takahashi | |
| 2005/0108225 A1 | 5/2005 | Chau | |
| 2005/0198076 A1 | 9/2005 | Stata | |
| 2006/0053097 A1 | 3/2006 | King | |
| 2007/0130109 A1 | 6/2007 | King | |
| 2008/0270375 A1 | 10/2008 | Nanduri | |
| 2008/0275906 A1 | 11/2008 | Rhoads | |
| 2008/0301130 A1 * | 12/2008 | Fontoura et al. | 707/5 |
| 2010/0332502 A1 * | 12/2010 | Carmel et al. | 707/759 |

OTHER PUBLICATIONS

Andoni, Alexandr et al.; "Near-Optimal hashing algorithms for approximate nearest neighbors"; 2008, Communications of the ACM, vol. 51, No. 1, pp. 117-122.
Gionis, Aristides et al.; "Similarity Search in High Dimension via Hashing"; 1999, Proceedings of the 25$^{th}$ VLDB Conference, Edinburgh Scotland, 12 pages.

* cited by examiner

*Primary Examiner* — Cindy Nguyen

(57) ABSTRACT

Documents are assigned to one or more indexes in a document indexing system on the basis of document properties such as total number of tokens in the document, number of numeric tokens in the document, number of alphabetic tokens in the document, size of the document, and metadata associated with the document. Based on statistical distributions of document properties (over a large number of documents), different indexes can be defined, and a document router can direct a particular document to one index or another based on the properties of the particular document. In some implementations, certain document properties may be used to identify a nonrelevant document, or garbage document, so that it is either not indexed or assigned to an index dedicated for such documents.

17 Claims, 4 Drawing Sheets

ADAPTIVE ROUTING OF DOCUMENTS TO SEARCHABLE INDEXES

CROSS REFERENCE TO RELATED APPLICATION

This application claims the benefit of U.S. Provisional Application No. 61/300,426, filed Feb. 1, 2010, entitled "Adaptive Indexing To Improve Indexing And Search Performance," the disclosure of which is incorporated by reference herein in its entirety.

BACKGROUND

The present disclosure relates to techniques for organizing and retrieving information and more particularly to indexing of electronic documents to facilitate search query processing.

With the proliferation of electronic documents and communications, there has been an increased need to assist users in finding relevant documents. A search engine can scan documents in a corpus and extract text; however, real-time scanning of a large corpus of documents is impractical. Accordingly, it is now common practice for search engines to scan a corpus and create an index—a condensed representation of document content that can be readily searched. A typical indexing process usually involves creating a "forward" index in which each document is associated with a list of words that appear in the document, then processing the forward index to create an "inverted" index, in which each word is associated with a list of documents that contain that word. (The inverted index is usually condensed using hashing techniques or the like to reduce storage requirements and also to facilitate locating a given word.) The inverted index is most often used as the starting point for processing search queries where the user specifies a particular word or words to be found.

The size of the index can become a limiting factor in both indexing and search processes. For example, the time needed to invert a forward index will generally scale with the number of documents or number of words. The time needed to search an index will also increase with the number of words and/or documents in the index.

One way to speed up indexing and search processes is to provide multiple indexes and to assign different documents to different indexes. Index construction and search processes can then be performed in parallel on multiple smaller indexes, resulting in faster performance. In systems where multiple search indexes are used, a given document can be randomly or arbitrarily assigned to one of the indexes.

SUMMARY

In many search systems, there is little control over the kind of documents that enter the system. An incoming document may contain large blocks of numerical/financial data, or it may contain inline objects or binary data that cannot be identified as non-readable etc. Where the documents are arbitrarily or randomly routed to different indexes, it is possible that the indexes will vary widely in size, number of words, etc. This results in unpredictable throughput for both indexing and search operations, as the larger indexes will generally require more processing time both during construction (e.g., inverting the forward index) and during query processing.

Certain embodiments of the present invention provide a document router that directs documents to one of a number of indexes based on features of the document, thereby allowing for better balanced indexes and more predictable indexing and search performance. The router selects the index for a particular document based on various document properties (also referred to as features), such as: (1) the number of tokens in the document; (2) the number of numeric tokens in the document; (3) the number of alphabetic tokens in the document; (4) the primary language of the document; and/or (5) other document metadata. Based on statistical distributions of document properties (over a large number of documents), limits on various measures of the size of a given index can be defined, and a document router can direct a particular document to one index or another based on the properties of the particular document, the defined limits for an index, and the current size of the index. As a result, throughput and performance of the indexes can be optimized. In some embodiments, the optimization includes balancing the indexes in terms of storage, number of tokens and the like, so that both index construction and query response times are consistent from one index to another.

In some embodiments, certain document properties may be used to identify a nonrelevant document, or garbage document, so that it is either not indexed or assigned to an index dedicated for such documents so that performance of other indexes is not adversely affected by nonrelevant documents. While performance of the "garbage" index may be slower than other indexes, a user can choose whether or not to include the garbage index in a search query.

One aspect of the invention relates to methods of indexing documents. Feature information is extracted from each document that is to be indexed. Based on statistical properties of the extracted feature information, a set of indexes is defined. For example, for each index, an upper limit can be established on one or more parameters measuring size of the index, such as a number of documents in the index, a number of tokens in the index, and/or a total size of the documents in the index. For a particular document, one of the indexes is selected as a destination index for the document based on the feature information extracted from the document, and a searchable representation of the document is added to the destination index. The indexes can be stored in a computer-readable storage medium, e.g., for use in responding to search queries.

In some embodiments, the destination index is selected by identifying one of the indexes as current and determining, for each of the one or more parameters, whether adding the document to the current index will result in the index exceeding the upper limit on the parameter. The current index is used as the destination index if adding the document to the current index will not result in the index exceeding the upper limit on any of the one or more parameters; if not, then a different index is selected as current and the determination is made for that index.

In some embodiments, a garbage index is also defined. During selection of a destination index for a document, if the document satisfies a criterion indicating that the document is unlikely to be relevant to a subsequent search query, the garbage index is selected as the destination index for the document. Unlikely relevance can be determined in various ways, e.g., based on whether the fraction of tokens in the document that are nonalphanumeric tokens exceeds a threshold. In other embodiments, indexing can be skipped for documents determined to be unlikely to be relevant to a subsequent search query.

In some embodiments, document metadata can be a factor in index selection. Examples of metadata that can be considered include a language associated with the document, a source or custodian from which the document was collected, a date or date range associated with the document, a document type (e.g., word processor file, spreadsheet, e-mail, image), or the like. Defining the indexes can include associating different indexes with particular metadata (e.g., a particular language, a particular source, or a particular document type). Based on the metadata for a document to be indexed, selecting the destination index for the document can be performed such that the destination index is associated with the metadata for that document. In some embodiments, multiple indexes can be associated with the same metadata (e.g., multiple indexes for documents in a given language), and metadata-based index selection is in addition to selection based on statistical features or properties of the document.

Another aspect of the invention relates to computer-readable storage media encoded with program code that, when executed by a computer system, causes the computer system to execute a method of indexing documents. The method can include generating a token-based representation of a number of documents and extracting feature information from the token-based representations of the documents. Indexes for the documents are then defined, and this can include defining an upper limit for each of a number of size parameters for the indexes (e.g., a number of documents in the index, a number of tokens in the index, and a total size of the documents in the index). These upper limits can be defined such that when populated with documents, the indexes will be balanced in size relative to each other. One of the indexes is selected as a destination index for a particular document based on the feature information for the document, the current values of the size parameters for at least one of the indexes, and the upper limits for the size parameters. A searchable representation of the document is to the destination index, and the size parameters of the destination index are updated based on the feature information for the document.

In some embodiments, when a search query is received from a source, the indexes are searched to identify documents that match the search query. A search report, including identifying information of the documents that match the search query, is transmitted to the source. In some embodiments, the search query can specify a subset of the indexes to be searched, and the search can be limited to the specified subset of the indexes.

Another aspect of the invention relates to a computer system that has a storage subsystem configured to store document indexes and a processor coupled to the storage subsystem. The processor can be configured to extract feature information from a set of documents and define an upper limit for each of a plurality of size parameters for the plurality of document indexes (e.g., based on the feature information extracted from the documents). The processor can also be configured to select one of the document indexes as a destination index for a particular document based on the feature information extracted from the document, a set of current values of the size parameters for the indexes, and the upper limits for the size parameters for the indexes; to store a searchable representation of the document in the destination index; and to update the size parameters of the destination index based on the feature information for the document.

The invention will be better understood by reference to the following detailed description in connection with the accompanying drawings.

DETAILED DESCRIPTION

Figure 1:
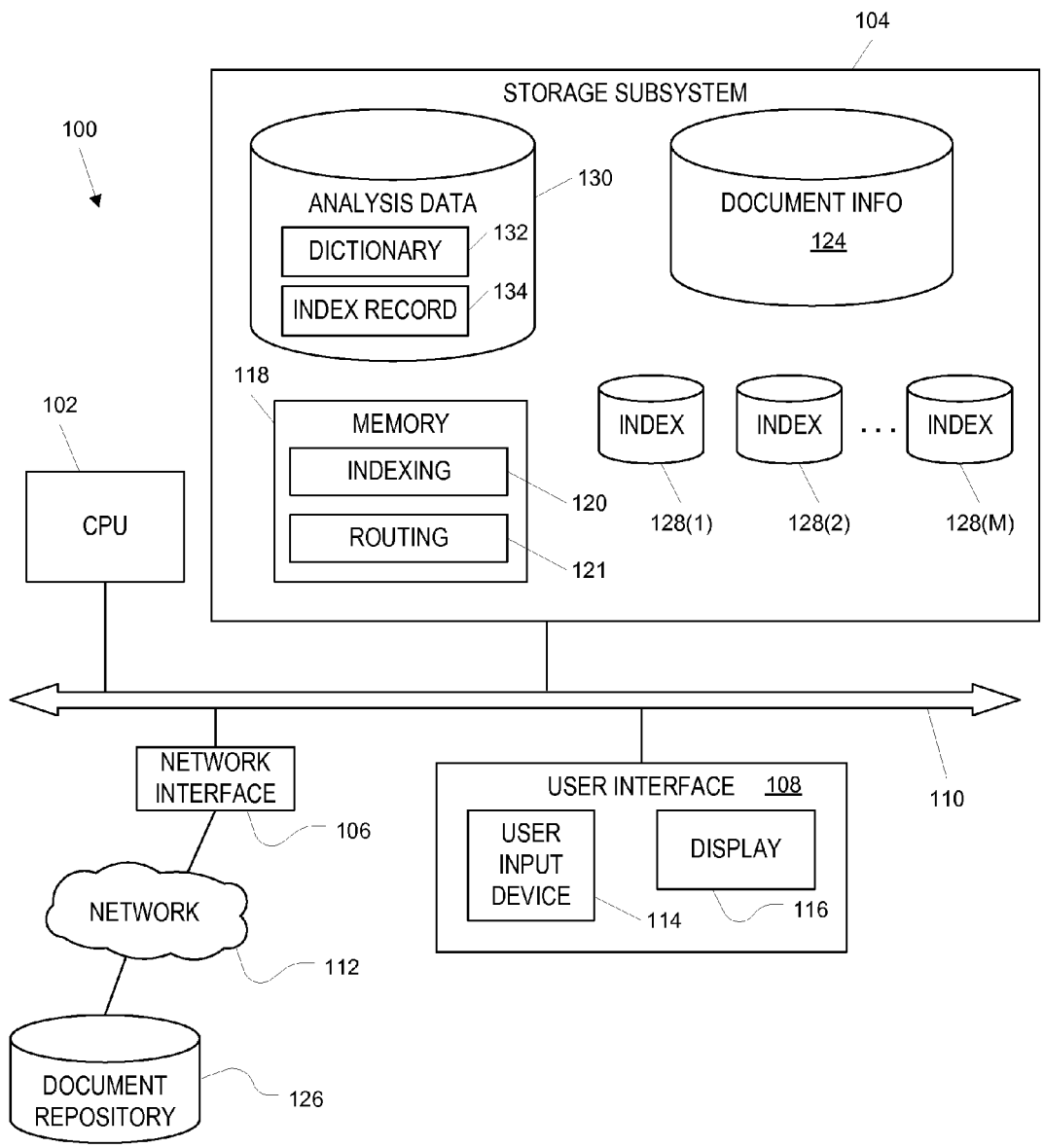
FIG. 1 is a block diagram of a computer system according to an embodiment of the present invention.

Certain embodiments of the present invention provide a document router that directs documents to one of a number of indexes based on features of the document, thereby allowing for better balanced indexes and more predictable indexing and search performance. The router selects the index for a particular document based on various document properties (also referred to as features), such as: (1) the number of tokens in the document; (2) the number of numeric tokens in the document; (3) the number of alphabetic tokens in the document; (4) the primary language of the document; and/or (5) other document metadata. Based on statistical distributions of document properties (over a large number of documents), limits on various measures of the size of a given index can be defined, and a document router can direct a particular document to one index or another based on the properties of the particular document, the defined limits for an index, and the current size of the index. As a result, throughput and performance of the indexes can be optimized. In some embodiments, the optimization includes balancing the indexes in terms of storage, number of tokens and the like, so that both index construction and query response times are consistent from one index to another.

In some embodiments, certain document properties may be used to identify a nonrelevant document, or garbage document, so that it is either not indexed or assigned to an index dedicated for such documents so that performance of other indexes is not adversely affected by nonrelevant documents. While performance of the "garbage" index may be slower than other indexes, a user can choose whether or not to include the garbage index in a search query.

Some embodiments can be used to provide balanced full text indexing regardless of type of data and to attain predictable throughput in terms of indexing and search response. The indexing process can have balance in terms of inverted index storage, number of tokens, and the like, with the result that the time required to create or search an index is consistent and predictable across different indexes within the system. Without this capability, a fraction of documents in a database can bloat one index relative to others.

Further, the indexing can be distributed based on incoming data characteristics so that indexing completes in a predictable fashion. In some embodiments, multiple indexes can be created and populated in parallel, after which a decision can be made to merge some of the indexes. The decision to merge particular indexes is based on index size and other statistical features, and can be aimed at further balancing the indexes in terms of number of tokens and/or number of documents. Ensuring that indexes are well balanced can provide improved control over performance, since all indexes will have comparable response times when a search is performed.

In addition, the approach allows characterization of the set of documents that need to be indexed and the elimination of documents that do not have to be indexed, such as those that appear to be garbage documents. The invention can generally be employed in a system that stores and indexes a large number of documents (e.g., enterprise documents) in a text index.

System Overview

FIG. 1 is a block diagram of a computer system 100 according to an embodiment of the present invention. Computer system 100 includes a CPU 102, storage subsystem 104, network interface 106, and user interface 108 connected via a bus 110. CPU 102 can be, e.g., any programmable general-purpose processor. Network interface 106 provides access to one or more other computer systems via a network 112, which can include, e.g., a local area network (LAN), a wide area network (WAN), the Internet (a globally interconnected network of computer networks), a virtual private network, and so on. Network interface 106 can be implemented using standard protocols, including wired protocols (e.g., Ethernet) and/or wireless protocols (e.g., any IEEE 802.11 protocol). User interface 108 can include one or more input devices 114 such as a keyboard, mouse, touch screen, touch pad, etc., and one or more output devices such as a display 116. Bus 110 can be implemented using conventional bus architectures and may include bridges, bus controllers, and the like.

Storage subsystem 104 incorporates various computer-readable storage media to provide storage for programs and data accessed by CPU 102 and/or other components of computer system 100. In the embodiment shown, storage subsystem 104 includes primary memory 118. Primary memory 118 provides the fastest access times and can be implemented using known memory technologies such as DRAM (dynamic random access memory) and/or SRAM (static random access memory). Primary memory 118 is advantageously used at any given time to store programs and/or data that are actively in use by CPU 102. Thus, for example, memory 118 is shown as storing an indexing program 120 that, when executed, causes CPU 102 to index document content in a selected index. Various forms of indexing, including but not limited to full-text indexing, can be provided. In some embodiments, indexing program 120 can be of generally conventional design. Memory 118 in this example also stores a routing program 121 that, when executed, causes CPU 102 to select an index for a particular document. Examples of processes that can be used in routing program 121 to assign documents to an index are described below.

Storage subsystem 104 in this embodiment also provides various secondary storage areas, which can include, e.g., magnetic media such as conventional hard or floppy disks, optical media such as compact disc (CD), digital versatile disc (DVD), or the like, and/or semiconductor media such as flash memory. Secondary storage areas generally have longer access time than primary memory 118 but have larger storage capacity. In this example, secondary storage areas are provided for an analysis data store 130 and a document information data store 124.

Document information data store 124 provides information (also referred to as metadata) about a corpus of documents. As used herein, a "corpus" of documents can be any collection of documents about which information is to be provided to a user of system 100. In one embodiment, the corpus of documents (or a portion thereof) can be stored in a document repository 126 that is remote from computer system 100 and accessible via network interface 106 and network 112. In another embodiment, the corpus (or a portion thereof) can be stored locally, e.g., within storage subsystem 104. The corpus can be centralized or distributed (e.g., it can be a collection of World Wide Web documents that are stored on respective web servers connected to network 112 as is known in the art) as desired, and document information data store 124 might or might not contain actual documents.

Document information data store 124 can include a document record for each document in the corpus. The document record can include, e.g., a unique identifier of the document and metadata about the document, including for example results of various content-based analysis operations that may be performed on a document. Thus, for example, metadata may include document properties such as number of tokens, number of numerical tokens, number of alphanumeric tokens; metadata may also identify the document as belonging to one or more semantic clusters, identify a language (or languages) associated with the document, indicate one or more other documents as being near-duplicates of the document, and so on. Other information about the documents can also be stored, such as date of creation, editing, and/or addition to the corpus; type of document (e.g., e-mail, web page, word processor document); author; source or location from which the document was obtained; keywords; and so on.

Indexes 128(1)-128(M) (for arbitrary integer M) store a searchable representation of document content for the documents of the corpus. In some embodiments, multiple indexes 128 can be searched in parallel, thereby speeding search response time. Prior to searching, indexes 128 can be populated by operation of indexing program 120, which parses document content and builds up a searchable representation of content for some number of documents as an index 128. Multiple indexes 128 are advantageously provided, and different documents can be assigned to different ones of indexes 128. The assignment of documents to indexes 128 is advantageously made under control of routing program 121 as described below. In some embodiments, routing program 121 assigns documents to indexes based on document properties such that indexes 128 remain balanced. One of indexes 128 (e.g., index 128(M)) may be designated as a low-priority or "garbage" index, and routing program 121 may assign documents likely to be of low relevance to any users to this index. In some embodiments, when the user searches indexes 128, the user can specify whether the low-priority index should be included in the search or not. In some embodiments, one of indexes 128 can be designated to contain only large documents. (Where an index is referred to as "containing" a document, it is understood that the index contains a representation of the document, preferably in a searchable form; this form might or might not be identical to the entire document.)

Analysis data store 130 in this embodiment provides data that can be referenced by programs executing on CPU 102, e.g., indexing program 121 and/or routing program 120. For example, analysis data store 130 can include a dictionary 132. As used herein, a "dictionary" can include any list of words (i.e., character strings) in any language or combination of languages, and the list can include any number of words. Dictionary 132 can be used to define a "word space" for purposes of characterizing a document, e.g., by maintaining a list of recognized words (or tokens). Analysis data store 130 can also maintain a record of index properties 134, such as the number of documents or number of tokens in each index 128. (Alternatively, index properties can be stored with each index 128.) This information can be used by router program 121 in determining the assignment of documents to indexes 128. Analysis data store 130 can also include other data that may be useful in analyzing documents.

It will be appreciated that computer system 100 is illustrative and that variations and modifications are possible. For example, although storage subsystem 104 is shown as local to system 100, in alternative embodiments, all or part of storage subsystem 104 can be implemented as remote storage, e.g., on a storage area network (SAN) or other remote server accessible via network 112. Thus, for example, document information data store 124, indexes 128, and/or analysis data store 130 can be stored locally or remotely as desired. Further, although indexing program 120 and routing program 121 are shown as residing in primary memory 118, the invention is not limited to any particular mechanism for supplying program instructions for execution by CPU 102. For instance, at any given time some or all of the program instructions for indexing program 120 or routing program 121 may be present within CPU 120 (e.g., in an on-chip instruction cache and/or various buffers and registers), in a page file or memory mapped file on a system disk, and/or in other local or remote storage space. In some embodiments, computer system 100 might be implemented as a server accessible to a user via a network, and user interface 108 is optional. Computer system 100 may also include additional components such as floppy disk drives, optical media drives (e.g., CD or DVD), network interface components, USB interface, and the like. Computer system 100 can be configured with many different hardware components and can be made in many dimensions and styles (e.g., laptop, tablet, server, workstation, mainframe); network connections may be provided via any suitable transport media (e.g., wired, optical, and/or wireless media) and any suitable communication protocol (e.g., TCP/IP). A particular computer architecture or platform is not critical to the present invention.

Routing Documents to Indexes

Figure 2:
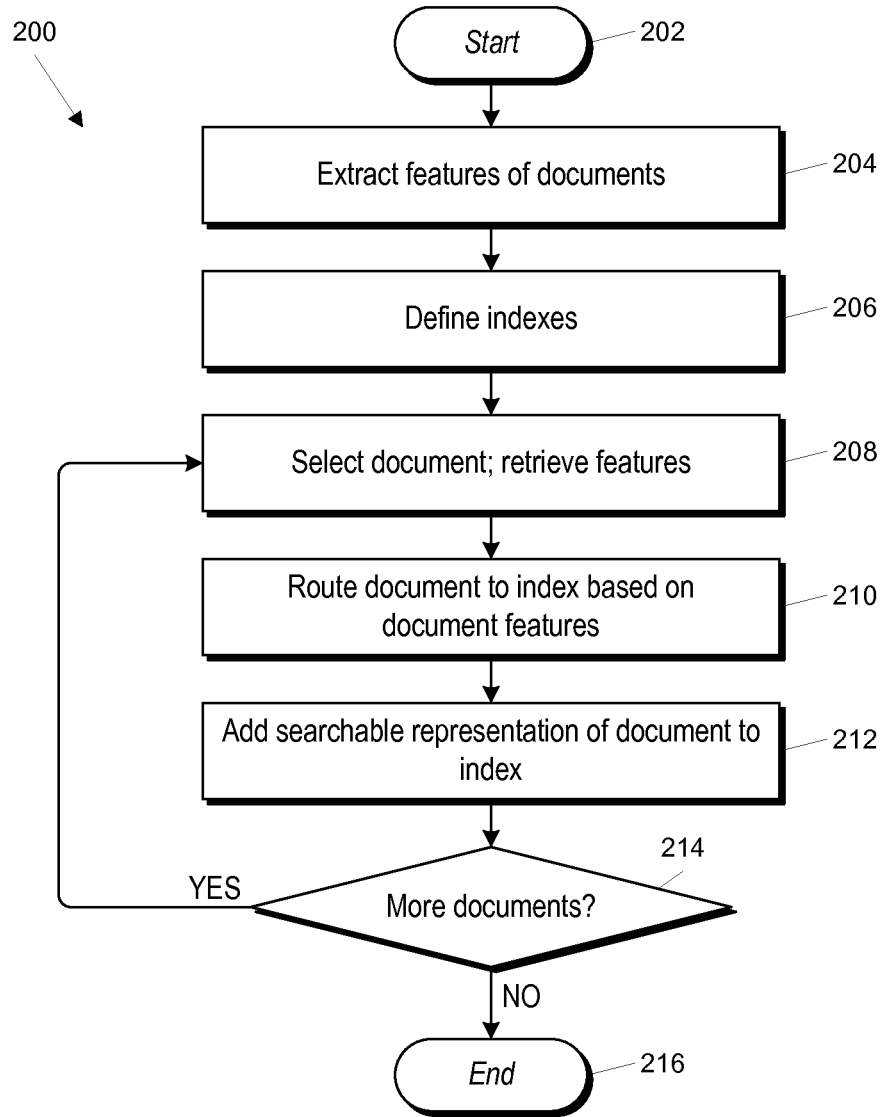
FIG. 2 is a flow diagram of a routing and indexing process according to an embodiment of the invention.

FIG. 2 illustrates a routing and indexing process 200 according to an embodiment of the invention. Process 200 can be implemented, e.g., in routing program 121 of FIG. 1.

Process 200 starts (block 202) when a document corpus is input to the system. Properties or features of the documents are extracted at block 204 for use in routing each document to one of the available indexes (e.g., indexes 128 of FIG. 1). Extracting the features generally includes parsing the document into tokens. As used herein, a "token" refers to a sequence of characters that has been isolated from surrounding characters. In some instances, a token can correspond to a word, but a token can also correspond to a number or arbitrary character string. Conventional techniques or other techniques can be used to parse a document into tokens. For example, in the case of documents in English, tokens can be isolated based on recognized token separators (e.g., a space or punctuation character). For documents in other languages (e.g., Arabic or Japanese), token separators may not be distinct characters, and various language-specific analysis techniques can be used to parse such documents into tokens.

Various document features can then be defined based on the tokens. In one embodiment, the following document features are extracted:

(1) Number of tokens in the document. In some embodiments, the number of unique (or distinct) tokens in the document is counted. Thus, for example, each word that occurs at least once in the document would count as one token, regardless of the number of occurrences. In some embodiments where tokens correspond to words, words derived from the same stem can be regarded as the same token so that, for instance, "patent," "patented," "patents," and "patentable" could all be regarded as the same token; in other embodiments, different words formed from the same stem can be treated as distinct tokens. Further, the token count can be case-sensitive or not as desired (e.g., "PATENT" and "Patent" might or might not be treated as distinct tokens.) In other embodiments, the total number of tokens is counted, and a recurring word would be counted as multiple tokens. In some embodiments, both the number of unique tokens and the total number of tokens can be counted.

(2) Number of numeric tokens in the document. Some tokens are or contain numeric characters (e.g., digits 0-9). These can be identified as numeric tokens. Similarly to the token count, the numeric token count can reflect the total number of numeric tokens, the number of unique numeric tokens, or both. In some embodiments, the fraction of numeric tokens in the document (number of numeric tokens divided by total number of tokens) is also used.

(3) Number of alphabetic tokens. "Alphabetic" tokens as used herein refers to tokens that contain only alphabetic characters (e.g., letters A-Z, a-z). The count can be case-sensitive or case-insensitive. As with the counts above, the alphabetic token count can reflect the total number of alphabetic tokens, the number of unique alphabetic tokens, or both. In some embodiments, the fraction of alphabetic tokens in the document (number of alphabetic tokens divided by total number of tokens) is also used.

(4) Fraction of known words in document. In some embodiments, a list of known words is maintained (e.g., in dictionary 132 of FIG. 1). Tokens extracted from the document are compared to the list of known words, and the fraction of known words can be defined as the number of tokens that match a word on the list divided by the total number of tokens. In some embodiments, the fraction is based on the number of unique tokens in the document; in other embodiments, repeated tokens are counted multiple times. In some embodiments, numeric tokens are treated as known words; in other embodiments as unknown words.

In addition to the token-based features, other information about the document can be extracted or provided; such information is referred to as "metadata." Metadata can include any information about the document that may be of interest to a user analyzing the corpus. Examples of metadata include creation or modification date, type of document (e.g., word processor document, spreadsheet, e-mail, image), language, author or creator, source (e.g., location in a file system) or custodian from which the document was added to the corpus, and so on. In some embodiments, metadata can also include information about document attributes such as a primary language in which the document is written. In some embodiments, the primary language of a document can be automatically determined, e.g., using techniques described in commonly-assigned co-pending U.S. patent application Ser. No. 12/274,182, filed Nov. 19, 2008, entitled "Language Identification for Documents Containing Multiple Languages." Other techniques for language identification can also be used.

These and/or other features can be extracted at block 204, and the extracted features for each document are advantageously stored in association with the document (or a document identifier) for later reference.

Based on the extracted features and statistical distributions of these features across the document set, indexes can be defined at block 206. In some embodiments, defining the indexes can include determining how many indexes will be provided and assigning characteristics to each. For example, the characteristics can include a language (or languages) associated with the index and/or various thresholds or other parameters that limit the size of an index. Examples of thresholds include the maximum number of documents in an index, the maximum number of tokens (or unique tokens), the maximum aggregate size of the documents indexed in a particular index, and so on. The same thresholds can be assigned to all indexes, or different indexes can have different thresholds. In some embodiments, one index can be defined as a "garbage" index, to which documents deemed unlikely to be relevant to any user query are routed. In some embodiments, the number of indexes is not defined in advance, and new indexes are created dynamically as needed, e.g., when a document cannot be routed to any existing index without violating the size-limiting parameters of the existing index.

Once the indexes are defined, documents are assigned to indexes. For example, at block 208, a document is selected. At block 210, the selected document is assigned (or routed) to an index based on features of the document. Specific examples of routing processes that can be used at block 210 are described below. In some embodiments, block 210 includes retrieving from storage the features that were extracted at block 204, avoiding repetition of the feature-extraction process. At block 212, a searchable representation of the document is added to the index to which the document was routed. Conventional (or other) techniques for constructing a searchable representation of document content can be used, and a particular indexing technique is not critical to understanding the present disclosure.

At block 214, if more documents remain to be indexed, process 200 returns to block 208 to select another document. Once all documents have been indexed, process 200 ends (block 216).

It will be appreciated that process 200 is illustrative and that variations and modifications are possible. Steps described as sequential may be executed in parallel, order of steps may be varied, and steps may be modified, combined, added or omitted. For instance, the particular features of a document used to select an index and the manner in which indexes are defined can be varied.

In some embodiments, documents may be added to the corpus over an extended period of time, and newly received documents can be added to existing indexes using process 200. In some embodiments, the thresholds and/or other parameters used to characterize the indexes can be dynamically varied as the size of the indexed document corpus increases. Thus, for example, if there are M indexes and D documents, each index may be limited to holding $D^*(c/M)$ documents for some constant c. (The constant c is advantageously somewhat larger than 1, so that indexes can contain unequal numbers of documents. This allows the indexes to be further balanced based on additional criteria such as document size or number of tokens.) As the number of documents D increases, so does the maximum number of documents per index. Alternatively, the maximum number of documents per index can be fixed, and a new index can be created dynamically whenever a document cannot be routed to an existing index (whether because all indexes have reached their maximum number of documents or because of some other limit on index size).

Figure 3:
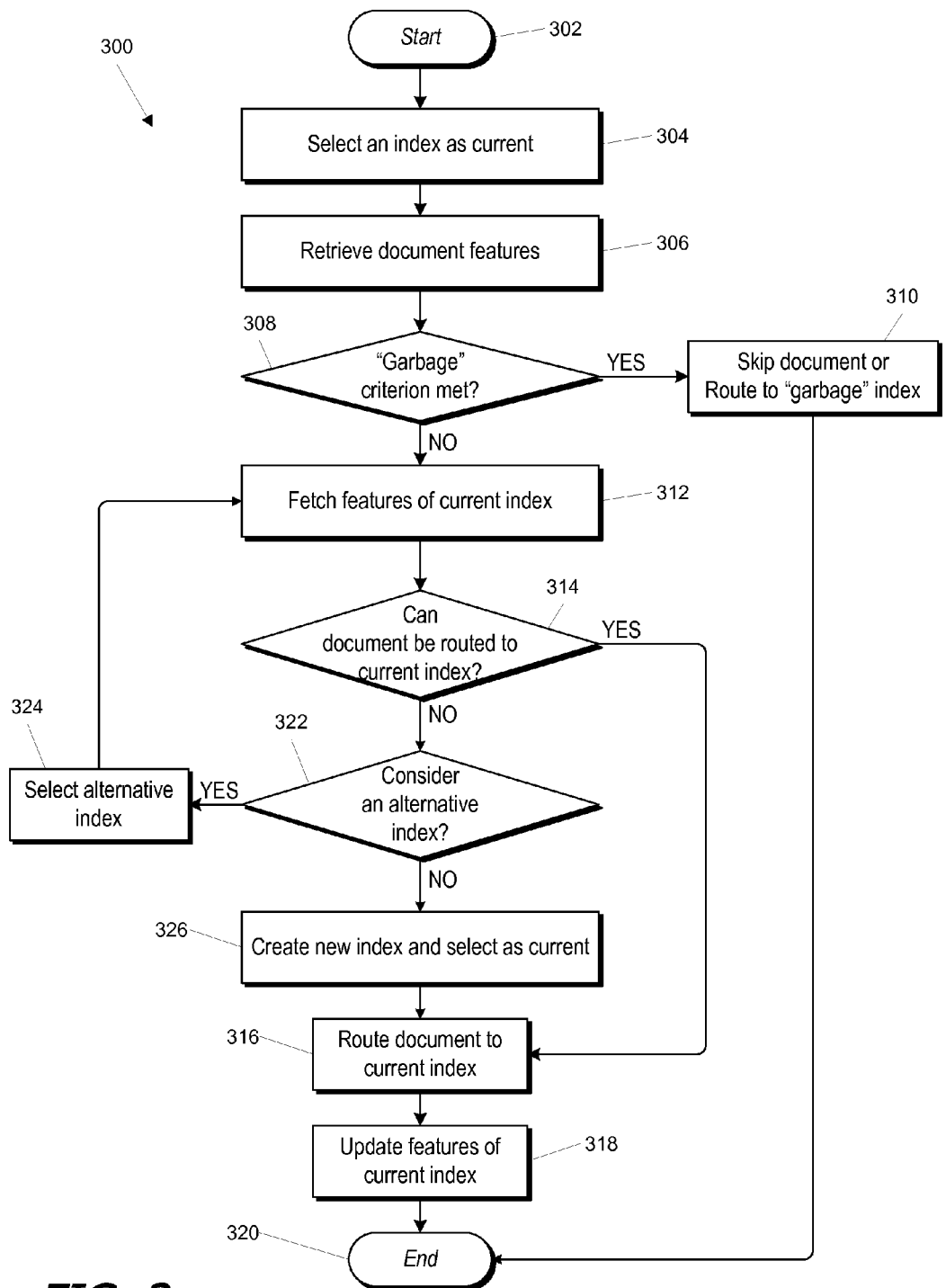
FIG. 3 is a flow diagram of a process for routing a document to an index according to an embodiment of the present invention.

FIG. 3 is a flow diagram of a process 300 for routing a document to an index according to an embodiment of the present invention. Process 300 can be implemented, e.g., at block 210 of process 200 (FIG. 2). Process 300 starts (block 302) when a document is selected for routing and indexing. At block 304, one of the indexes is selected as current. In some embodiments, an initial current index is selected arbitrarily (e.g., if the indexes are identified by sequential numeric identifiers, the index with the lowest numeric identifier can be selected), and thereafter the same index remains selected as current until a different selection is prompted during the course of executing process 300 (in particular, at block 322 as described below).

At block 306, features of the current document (e.g., any or all of the features extracted at block 204 of process 200 of FIG. 2) are retrieved. In some embodiments, feature extraction can be repeated; however, storage and retrieval of the feature data can reduce processing time.

At block 308, a "garbage" criterion is applied. As used herein, a "garbage" document refers to a document that is unlikely to be relevant to any user query, and the garbage criterion can be any criterion that distinguishes such documents from documents that are likely to be relevant to at least some user queries. For example, in some embodiments, searches are text-based, and the garbage criterion is met if the fraction of nonalphanumeric tokens in the document exceeds a threshold. Such a criterion can identify documents that contain entirely or predominantly image data or other non-textual data and thus are unlikely to be returned as search results in text-based search. Other criteria for identifying garbage documents can also be used. At block 310, if the document is identified as garbage, it can be skipped (not indexed at all) or routed to a dedicated garbage index. It should be noted that in implementations of process 300, the garbage index advantageously does not become the "current" index for the next document to be routed.

Once garbage documents have been identified, the remaining documents can be subject to further routing decisions. More specifically, in this embodiment, at block 312, features of the current index are fetched. The features of the current index can include, e.g., the number of documents in the index, the aggregate size of the documents in the index, the total number of tokens or number of distinct tokens in the index, and/or any other feature that can be used to determine whether a particular document should be routed to that index.

At block 314, based on the features of the current index and the features of the document, a determination is made as to whether the document can be routed to the current index. In some embodiments, the determination is based on determining whether adding the document will cause some property of the current index to exceed a threshold; specific examples are described below. Multiple properties can be taken into account.

If the document can be routed to the index, then at block 316, the document is routed to the current index. At block 318, features of the current index are updated to reflect the addition of the document, and process 300 ends (block 320).

If, however, the document cannot be routed to the current index, then at block 322, it is determined whether an alternative index (which can be any index other than the current index or a garbage index) should be considered; if so, then at block 324, the alternative index is selected as current, and process 300 returns to block 312 to determine whether the document can be added to that index. In some embodiments, all existing indexes (other than the garbage index if there is one) can be considered in turn until an index is found to which the document can be routed. The order in which alternative indexes are considered is not relevant; selection can be random, pseudorandom, round-robin, or any other scheme. Once an existing index has been considered and rejected for a particular document, it should not be considered again for that document, but it can be considered again for different documents. Thus, for example, even if one document is too big to add to index 128(1), a smaller document can be considered.

If, at block 322, no alternative indexes remain to be considered, then at block 326, a new index is created. The new index becomes the current index, and the document is routed to this index at block 316. Here it is assumed that the new document will not cause the new index (which is initially empty) to exceed any size limits; this can be ensured by defining the garbage criterion used at block 308 such that any document that is too big for an index is treated as garbage.

It should also be noted that in some embodiments, once the index selection is changed at block 324 or block 326, the new selection becomes the initial current index (block 304) for the next document to be processed.

Figure 4:
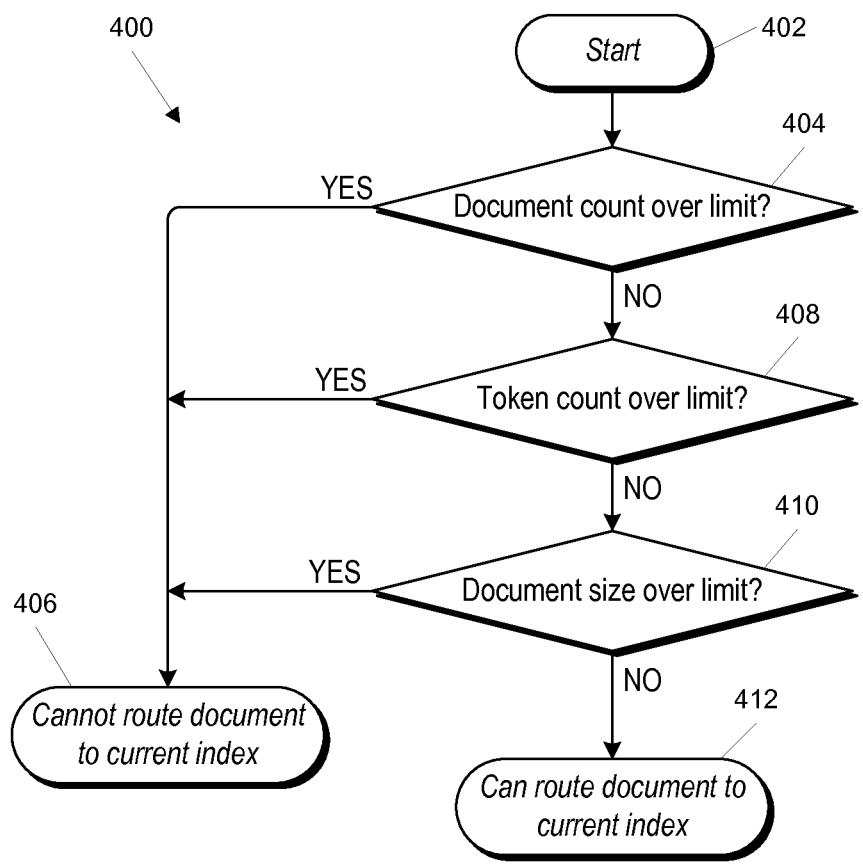
FIG. 4 is a flow diagram of a decision process for determining whether a document can be routed to a current index according to an embodiment of the present invention.

FIG. 4 is a flow diagram of a decision process 400 for determining whether a document can be routed to a current index according to an embodiment of the present invention.

Process 400 can be implemented, e.g., at block 314 of process 300 (FIG. 3). Process 400 tests whether limits on various measures of index size have been reached; the limits can be established (defined) when the indexes are defined (e.g., at block 206 of process 200 of FIG. 2).

Process 400 starts (block 402) with a document having known features and a current index having known features. At block 404, a first decision is based on the document count for the current index. If adding the current document to the number already present in the current index would put the index over the established limit on the number of documents, then the document cannot be routed to the current index, and process 400 ends at block 406.

Otherwise, at block 408, a second decision is based on the number of unique tokens (or the total number of tokens) in the document. If the number of tokens in the document, when added to the number already present in the current index, exceeds the established limit, then the document cannot be routed to the current index, and process 400 ends at block 406.

Otherwise, at block 410, a third decision is based on the document size. If the size of the document, when added to the size of all documents already indexed in the current index, exceeds a threshold, then the document cannot be routed to the current index, and process 400 ends at block 406. In some embodiments, document size can be used directly; in other embodiments, a document to be indexed can be analyzed to determine how many bytes would be added to the index size if the document is added, and a limit can be applied on the resulting index size rather than on the total size of documents in the index. In either case, the effect is similar since larger documents add more to index size than smaller documents.

If none of the conditions for selecting a different index are met, then the document can be routed to the current index, and process 400 ends at block 412.

It will be appreciated that the routing processes described herein are illustrative and that variations and modifications are possible. Steps described as sequential may be executed in parallel, order of steps may be varied, and steps may be modified, combined, added or omitted. The processes described herein can be repeated or executed multiple times in parallel to handle a document corpus of arbitrary size. Any number of indexes can be provided. Further, while the processes are described with reference to a single document, in some embodiments a group of documents can be routed together; such groupings may be arbitrary in nature or systematic as desired.

All thresholds or limits on index size can be adapted based on the number of indexes, size of the document corpus, type of documents being indexed, expected queries, hardware configuration, or the like. For example, thresholds can be tuned based on types of queries which need to be executed in a search system and type of hardware where computation is occurring. If it is expected that mainly (or only) simple keyword searches are to be performed, the threshold values can be very large. If complex queries (e.g., involving complex wild cards, Boolean connectors and proximity, or the like) are anticipated, thresholds can be tuned to get optimal performance. In one specific deployment where such complex queries are involved, thresholds can be set at around 40 million unique tokens, 12-15 GB index size and 1 to 1.5 million documents.

In some embodiments, other statistical criteria can also be used to select an index in addition to or instead of those described above. For example, fewer or more size parameters than shown in FIG. 4 might be considered.

In addition, criteria based on non-statistical features cane be used in combination with statistical criteria. For instance, different indexes can be associated with different languages, and a document that is determined to be in a particular language can be routed to an index associated with that language. One or more indexes can be associated with a given language, e.g., in approximate proportion to the fraction of documents that are in that language. Where multiple indexes are associated with the same language, other criteria (e.g., size-related criteria as described above) can be used to select one of the indexes when routing a particular document. In some embodiments where documents are routed based in part on language, a user can restrict a search to a particular language (or languages) and thereby reduce the number of indexes searched.

In still other embodiments, metadata other than language can also be used for index selection. For example, documents of different types (e.g., word processor documents, spreadsheets) can be grouped together in different subsets of the indexes; documents collected from a particular source can be grouped together; documents created or collected within a particular date range can be grouped together; and so on. It is to be understood that multiple indexes can be associated with documents in a single group and that metadata-based index selection is advantageously combined with statistical criteria.

Criteria for routing documents to a garbage index can also be varied. For example, if it is unlikely that a user would search based on numeric tokens, documents that contain primarily numeric tokens (e.g., spreadsheets or the like) can be routed to a separate index from documents that contain primarily words. As another example, the fraction of known words in a document can be used to route documents to a garbage index (or skip indexing altogether); for instance, if the document contains few known words, it may be very unlikely that the document would be returned in any search. In some embodiments, multiple garbage indexes can be provided, with each garbage index containing a different category of garbage.

Searching with Balanced Indexes

The processes described above produce indexes that are relatively balanced with respect to each other in terms of size, number of tokens, number of documents, etc. Once a document or group of documents is routed to an index, conventional indexing processes (or other indexing processes) can be used to populate the index without departing from the spirit or scope of the invention. Such processes can include adding a representation of the document to a forward index, generating an inverted index (e.g., using conventional merge or rebuild operations), and so on.

In some embodiments, indexing processes can run in parallel, with each process building a separate set of indexes for a different subset of documents in the corpus. After indexing, it may be desirable to merge some of the indexes (including indexes generated in different processes) in order to better balance index size and response times. The decision to merge particular indexes is based on index size and other statistical features, and can be aimed at further balancing the indexes in terms of number of tokens and/or number of documents. Ensuring that indexes are well balanced can provide improved control over performance, since all indexes will have comparable response times when a search is performed.

The indexes are advantageously made available to a user for search operations. For example, referring again to FIG. 1, CPU 102 may execute a search program that accepts queries via user interface 108, executes the query by searching indexes 128, and returns a response via user interface 108. In another example, a user can execute search queries remotely, e.g., by communicating with system 100 via network 112.

Depending on implementation, the queries can range from simple word lists to complex Boolean expressions with proximity operators and the like.

When a search query is received, system 100 can query indexes 128. For example, if the user provides a term (or terms) to be searched, system 100 can search each index 128 to identify some or all documents in which the search term (or terms) appear. Different indexes 128 can be searched asynchronously; to the extent that system 100 supports multitasking, the searches can be done at the same time. Particular techniques for searching an index given a query are not critical to understanding the present invention. The resulting documents (sometimes referred to as "hits"), or identifying information about the documents, are returned to the user in response to the query. In some embodiments, hits can be sorted or ranked, e.g., based on a relevance score. Such sorting is usually performed across indexes. Thus, the time needed to process a query depends on the time needed to search the indexes. Where the indexes are balanced, search times across all indexes will tend to be similar, resulting in predictable performance irrespective of the search query.

In a typical search system, interesting performance metrics include measures of completeness (recall) and measure of exactness (precision). "Completeness" refers to the degree to which all relevant documents are found, "exactness" to the degree to which irrelevant documents are excluded. Often, tradeoffs are made in designing search systems. For example, in Internet search, exactness is typically more important than completeness; accordingly, if searching a particular index takes too long, incomplete results from that index may be used, in the interest of improving response time. In other applications, such as electronic document discovery, completeness is as important as exactness; every document satisfying the search query should be returned to make sure that no relevant information is missed. In this context, incomplete results from an index are not desirable, and a given search will take more or less time depending on how the indexes are structured. Where the indexes are balanced by routing documents into separate indexes based on features of the documents, e.g., using techniques described herein, predictable search response times can be attained while providing a high degree of completeness. Index bloating (where one index becomes significantly larger and slower than others) can be avoided.

In some embodiments, searches can be restricted to subsets of the indexes. For example, as described above, documents in different languages may be routed to different indexes. If a user limits the search to a specific language, the search can be limited to indexes containing documents in that language.

As another example, as described above, some embodiments may provide a garbage index (or multiple garbage indexes), and the garbage index need not be balanced with the other (non-garbage) indexes. The garbage index can be unrestricted as to size and may become bloated relative to other indexes; as a result, searches that include the garbage index may take longer than searches that do not. In some embodiments, a user can select whether to include the garbage index in a search (or, in the case of multiple garbage indexes, which if any garbage indexes to include). Excluding the garbage index can improve response time but at some risk of incompleteness of results.

Further Embodiments

While the invention has been described with respect to specific embodiments, one skilled in the art will recognize that numerous modifications are possible. Some embodiments of the invention may be employed in any system that stores and indexes a large number of enterprise documents in a text index. Examples of such systems include electronic document discovery systems (such as those created and supported by Stratify, Inc., the assignee of the present application), content management systems, and so on.

As described above, embodiments of the present invention may be implemented as computer programs. Such programs may be encoded on various computer readable media for storage and/or transmission; suitable media include magnetic disk or tape, optical storage media such as compact disc (CD) or DVD (digital versatile disc), flash memory, and the like. Computer readable media encoded with the program code may be packaged with a device (e.g., microprocessor) capable of executing the program or provided separately from such devices. Document sets and indexes can be stored locally, remotely, on a storage area network or in any other accessible storage location.

In addition, while the embodiments described above may make reference to specific hardware and software components, those skilled in the art will appreciate that different combinations of hardware and/or software components may also be used and that particular operations described as being implemented in hardware might also be implemented in software or vice versa.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Thus, although the invention has been described with respect to specific embodiments, it will be appreciated that the invention is intended to cover all modifications and equivalents within the scope of the following claims.

What is claimed is:

1. A method of indexing documents, the method comprising:
    extracting, by a computer processor, feature information from each of a plurality of documents to be indexed;
    defining a plurality of indexes based on statistical properties of the extracted feature information, wherein the defining includes establishing, for each of the indexes, an upper limit on each of one or more parameters measuring a size of the index;
    for each of at least some of the documents:
        selecting one of the indexes as a destination index for the document based on the feature information extracted from the document, wherein the selecting includes:
            identifying a current index from among the plurality of indexes;
            determining, for each of the one or more parameters, whether adding the document to the current index will result in the index exceeding the upper limit on the parameter; and
            selecting the current index as the destination index for the document in the event that adding the document to the current index will not result in the index exceeding the upper limit on any of the one or more parameters; and adding a searchable representation of the document to the destination index;
and storing the plurality of indexes in a computer-readable storage medium.

2. The method of claim 1 wherein the one or more parameters include a parameter from a group consisting of a number of documents in the index, a number of tokens in the index, and a total size of the documents in the index.

3. The method of claim 1 further comprising:
defining a garbage index; and
wherein selecting one of the indexes as the destination index includes:
determining whether the document satisfies a criterion indicating that the document is unlikely to be relevant to a subsequent search query; and
selecting the garbage index as the destination index for the document in the event that the document satisfies the criterion.

4. The method of claim 3 wherein the criterion indicates that the document is unlikely to be relevant in the event that the fraction of tokens in the document that are nonalphanumeric tokens exceeds a threshold.

5. The method of claim 1 wherein selecting one of the indexes as the destination index includes:
determining whether the document satisfies a criterion indicating that the document is unlikely to be relevant to a subsequent search query, wherein the document is not added to any of the indexes in the event that the document satisfies the criterion.

6. The method of claim 1 wherein the document is associated with a metadata item, wherein defining the indexes includes associating different ones of the indexes with different values of the metadata item, and wherein selecting one of the indexes as a destination index for the document is performed based in part on the metadata item.

7. The method of claim 6 wherein the metadata item is selected from a group consisting of a language of the document, a document type, a creation date associated with the document, a modification date associated with the document, a source location associated with the document, a creator associated with the document, and a custodian associated with the document.

8. A non-transitory computer-readable storage medium encoded with program code that, when executed by a computer system, causes the computer system to execute a method of indexing documents, the method comprising:
generating a token-based representation of each of a plurality of documents;
extracting feature information from the token-based representations of the documents;
defining a plurality of indexes, including defining an upper limit for each of a plurality of size parameters measuring a size of each of the indexes; and
for at least one of the documents:
selecting one of the indexes as a destination index for the document based on the feature information, current values of the size parameters for at least one of the indexes, and the upper limits for the size parameters;
adding a searchable representation of the document to the destination index; and
updating the size parameters of the destination index based on the feature information for the document.

9. The non-transitory computer-readable storage medium of claim 8 wherein the size parameters include at least one parameter from a group consisting of a number of documents in the index, a number of tokens in the index, and a total size of the documents in the index.

10. The non-transitory computer-readable storage medium of claim 9 wherein the method further comprises:
defining a garbage index that has no upper limit for the plurality of size parameters;
identifying one or more of the documents as a garbage document based on a garbage criterion indicating that the document is unlikely to be relevant to a subsequent search query; and
adding a searchable representation of the garbage document to the garbage index.

11. The non-transitory computer-readable storage medium of claim 10 wherein the garbage criterion is based on a fraction of tokens in the document that are nonalphanumeric tokens.

12. The non-transitory computer-readable storage medium of claim 8 wherein the upper limits for the size parameters are defined such that when the indexes are populated with the plurality of documents, the indexes are of balanced size relative to each other.

13. The non-transitory computer-readable storage medium of claim 8 wherein the method further comprises:
receiving a search query from a source;
searching the plurality of indexes in response to the search query to identify one or more documents that match the search query; and
transmitting to the source a search report that includes identifying information of the one or more documents that match the search query.

14. The non-transitory computer-readable storage medium of claim 8 wherein the method further comprises:
receiving a search query from a source, the search query specifying a subset of the indexes to be searched;
searching the subset of the indexes in response to the search query to identify one or more documents that match the search query; and
transmitting to the source a search report that includes identifying information of the one or more documents that match the search query.

15. A computer system comprising:
a storage subsystem configured to store a plurality of document indexes; and
a processor coupled to the storage subsystem, the processor being configured to:
extract feature information from each of a plurality of documents;
define an upper limit for each of a plurality of size parameters for the plurality of document indexes, wherein the plurality of size parameters measure a size of each of the plurality of document indexes; and
for at least a first one of the documents:
select one of the document indexes as a destination index for the first document based on the feature information extracted from the first document, a set of current values of the size parameters for at least one of the indexes, and the upper limits for the size parameters for the at least one of the indexes;
store a searchable representation of the first document in the destination index; and
update the size parameters of the destination index based on the feature information for the first document.

16. The computer system of claim 15 wherein the size parameters include at least one parameter from a group consisting of a number of documents in the index, a number of tokens in the index, and a total size of the documents in the index.

17. The computer system of claim 15 wherein the plurality of document indexes includes a garbage index and wherein the processor is further configured to select the garbage index as the destination index for a second one of the documents based on a criterion indicating that the second document is unlikely to be relevant to a subsequent search query.

* * * * *